US012534175B2

(12) United States Patent
Weng

(10) Patent No.: US 12,534,175 B2
(45) Date of Patent: Jan. 27, 2026

(54) AIRCRAFT CABIN PORTION, AND AIRCRAFT HAVING A FLUID COLLECTOR

(71) Applicant: Airbus Operations GmbH, Hamburg (DE)

(72) Inventor: Alexander Weng, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 193 days.

(21) Appl. No.: 18/551,311

(22) PCT Filed: Mar. 25, 2022

(86) PCT No.: PCT/EP2022/057993
§ 371 (c)(1),
(2) Date: Sep. 19, 2023

(87) PCT Pub. No.: WO2022/207509
PCT Pub. Date: Oct. 6, 2022

(65) Prior Publication Data
US 2024/0174339 A1    May 30, 2024

(30) Foreign Application Priority Data
Mar. 29, 2021   (DE) .......................... 102021107814.8

(51) Int. Cl.
*B64C 1/06* (2006.01)
(52) U.S. Cl.
CPC .................................. *B64C 1/067* (2013.01)
(58) Field of Classification Search
CPC .................................................... B64C 1/067
See application file for complete search history.

(56) References Cited

U.S. PATENT DOCUMENTS

| 4,378,888 | A | 4/1983 | Reed |
| 2010/0044512 | A1* | 2/2010 | Paul .......................... B64C 1/067 244/129.1 |
| 2013/0009010 | A1 | 1/2013 | Auriac et al. |
| 2018/0162511 | A1* | 6/2018 | Larson ..................... B64C 1/067 |
| 2019/0127039 | A1 | 5/2019 | Hitchcock et al. |
| 2019/0284786 | A1 | 9/2019 | Kohler et al. |
| 2020/0156755 | A1 | 5/2020 | Cavarero et al. |

FOREIGN PATENT DOCUMENTS

| DE | 102018203847 A1 | 9/2019 |
| DE | 102018129183 A1 | 5/2020 |
| EP | 3476713 A1 | 5/2019 |

OTHER PUBLICATIONS

International Search Report for corresponding International Patent Application No. PCT/EP2022/057993 dated Jun. 20, 2022.
German Search Report for corresponding German Patent Application No. 102021107814.8 dated Jan. 24, 2022.

* cited by examiner

*Primary Examiner* — Angelisa L. Hicks
(74) *Attorney, Agent, or Firm* — Greer, Burns & Crain, Ltd.

(57) ABSTRACT

An aircraft cabin portion having a cabin device module which has an upper face, a fluid-guiding element located on the upper face of the cabin device module, and a fluid collector located at a lower end of the fluid-guiding element. The fluid collector may consist substantially of a flexible material which forms a lumen for draining a fluid, wherein the lumen has an entry opening located at the lower end of the fluid-guiding element so that the fluid flows from the at least one fluid-guiding element into the lumen. Also an aircraft having such an aircraft cabin portion.

19 Claims, 6 Drawing Sheets

FIG 7
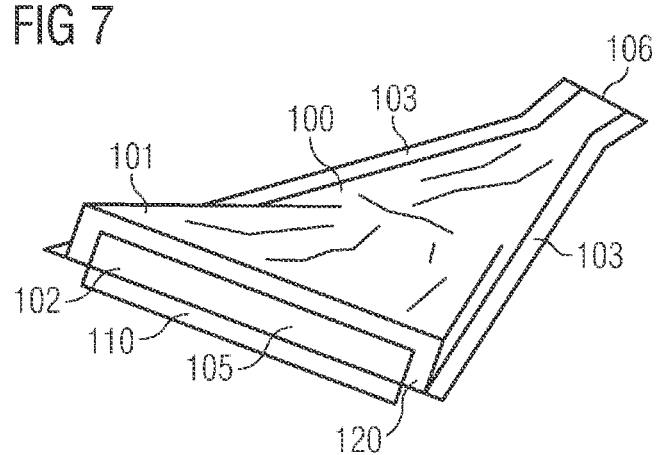
FIG 8(a)  FIG 8(b)  FIG 8(c)
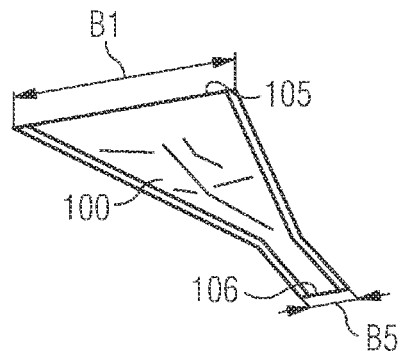 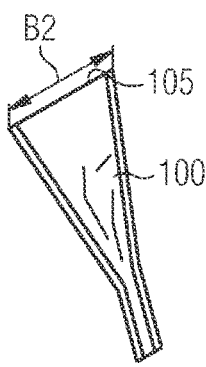 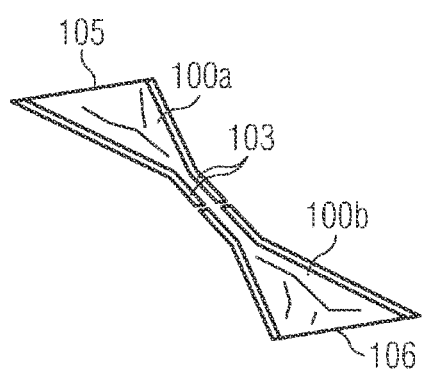
FIG 8(d)  FIG 8(e)
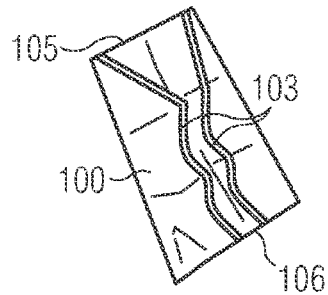 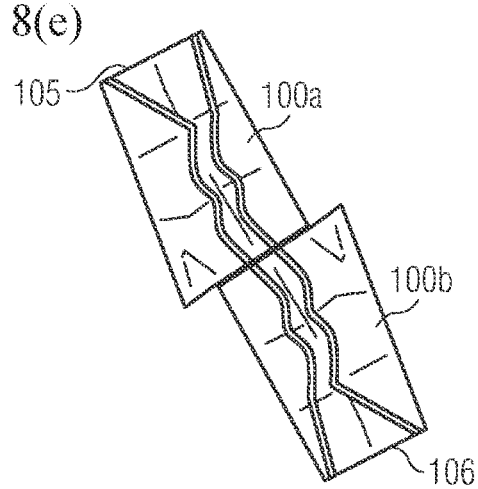

AIRCRAFT CABIN PORTION, AND AIRCRAFT HAVING A FLUID COLLECTOR

CROSS-REFERENCES TO RELATED APPLICATIONS

This application is a national phase of International Patent Application No. PCT/EP2022/057993, filed on Mar. 25, 2022, which claims the benefit of German Patent Application No. 10 2021 107 814.8, filed on Mar. 29, 2021, the entire disclosures of which are incorporated herein by way of reference.

FIELD OF THE INVENTION

The present invention relates to an aircraft cabin portion which comprises a liquid collector made from flexible material, and to an aircraft with an aircraft cabin portion of this type. In particular, the present invention relates to an aircraft cabin portion and an associated aircraft, the liquid collector which consists of flexible material collecting and discharging liquid from a top side of a cabin device module.

BACKGROUND OF THE INVENTION

In aircraft, condensation frequently accrues in the region of the exterior skin. Moisture from the air condenses increasingly in the interior compartment of the aircraft, in particular in the case of relatively long flight phases at high altitudes, in which very low temperatures (mostly below −50° C.) prevail outside the aircraft. Especially the breath of the passengers contains a large amount of moisture. In order to discharge the condensation which arises in this way before it passes into the interior compartment of the aircraft, in particular into the passenger cabin, a special water-conducting insulation means is attached along the exterior skin of the aircraft. This insulation means is designed in such a way that it can drain moisture and condensation on its outer side and discharges it next to the exterior skin of the aircraft into the bottom region of the aircraft fuselage (also called the bilge).

Condensation can arise or escape, however, in the ceiling region of the aircraft on account of the small slant of the exterior skin and insulation means, and can pass into the interior compartment of the aircraft. Device modules and trim panels are usually provided in the region of the passenger cabin, on the outer side or top side of which device modules and trim panels this condensation is collected and sometimes also discharged. For example, felt strips can be attached to the outer side of the modules and trim panels, which felt strips absorb condensation and output it to the surroundings again in the next drying phase, for example on the ground when no condensation accrues. A lower end of the module or the trim panel is usually arranged in such a way that the condensation flows to the next device module or trim element. Channels or pipes are also used in this transition region between two modules or trim elements, in order to forward the condensation in a targeted manner.

Since a very wide variety of aircraft components such as, for example, cables, water pipes, ventilation lines, electronic components, etc., are accommodated in the intermediate space between the outer side of the device module or trim element and insulation means on the exterior skin of the aircraft, the channels and felt strips and other condensation-conducting components have to have a very wide variety of shapes. Especially viewed in the longitudinal direction of the aircraft, the local conditions can vary, even if identical device modules are installed. Therefore, a multiplicity of condensation-conducting components which are installed on the device modules and trim elements have to be certified, produced and stocked.

SUMMARY OF THE INVENTION

The invention is therefore based on the object of simplifying the condensation draining in an aircraft.

This object is achieved by way of an aircraft cabin portion with the features as described in one or more embodiment herein, and by way of an aircraft with the features of one or more embodiments herein.

In accordance with a first aspect for improved understanding of the present disclosure, an aircraft cabin portion comprises a cabin device module which has a top side, a liquid-conducting element which is arranged on the top side of the cabin device module, and a liquid collector which is arranged at a lower end of the liquid-conducting element. Here, the liquid-conducting element can drain a liquid such as, for example, condensation which passes onto the top side of the cabin device module along the top side of the cabin device module.

Orientations and sides described herein such as, for example, top, bottom, top side, inner side, etc. are always to be understood in relation to the aircraft cabin portion in the installed state in an aircraft which is standing on the ground. The specification "top"/"upper" is thus to be understood in a direction substantially counter to the force of gravity, and "bottom"/"lower" means essentially in the direction of the force of gravity. Since the aircraft fuselage is of round cross section, these terms are not to be understood as oriented exactly in accordance with the force of gravity. Rather, a top side of a module is also a "top side" when its direction has at least one component in the direction counter to the force of gravity. In other words, a top side of a module can merge into a side wall or can form a portion of the side wall. The same applies mutatis mutandis to a bottom side of a module. "Inner" also relates to a direction or side which points into the center of the aircraft fuselage, while "outer" specifies a direction or side which points toward the exterior skin of the aircraft fuselage.

The liquid collector consists, in particular, of flexible material which forms a lumen for draining a liquid. The lumen (a cavity which is enclosed by the flexible material) has an inlet opening which is arranged at the lower end of the liquid-conducting element, with the result that the liquid flows from the at least one liquid-conducting element into the lumen. The lumen can be a cavity which is delimited by a shell. The cavity is, for example, of tubular configuration. Different cross-sectional shapes which can receive and forward liquids are also possible, however. The lumen can be configured as a container which consists of a flexible shell and receives liquid from a liquid-conducting element via the inlet opening. As a result of the use of a flexible material, the liquid collector and, in particular, its lumen can be laid in a highly flexible manner. Film, reinforced film or a woven fabric such as a coated woven fabric can be used as flexible material, for example.

It can also be provided in one embodiment that the liquid collector does not consist exclusively of flexible material, but rather also has a small proportion of rigid materials, for example in order to have a shaping effect.

Especially in regions of the aircraft cabin portion in which further components are provided on or in the vicinity of the top side of the cabin device module, the liquid collector which is produced from a flexible material can be laid in a simple and flexible manner. In contrast to previous channels which are manufactured from solid material, the liquid collector made from flexible material adapts to the surroundings. Different components do not have to be produced and stocked, but rather one liquid collector is sufficient which can be installed at a wide variety of locations in the aircraft and adapts to the local conditions there.

In addition, the liquid collector made from flexible material is considerably lighter. In comparison with previous channels made from solid material, a liquid collector made from film, for example, can have only 10% of the mass of a solid channel or less. For example, the film, from which the liquid collector is produced, can be a plastic film, a metal foil, a fiber-reinforced or fiber grid-reinforced film, a film with heat protection or a combination thereof. Flexible materials with a surface weight of from 35 to 165 g/m$^2$ can be used here. A film which is usually used to wrap an insulation means in the aircraft such as, for example, the primary insulation means can be used merely by way of example to produce the liquid collector. This already meets all the necessary requirements for the surface transport of liquid, for example of condensation.

In one implementation variant, the liquid collector can have an outlet opening which is arranged in such a way that liquid flows out of the lumen of the liquid collector. In other words, the liquid collector can be installed in the aircraft cabin portion in such a way that the outlet opening lies below the inlet opening, while the lumen runs between the inlet and outlet opening. As a result, liquid which enters the lumen at the inlet opening can be conducted through the lumen to the outlet opening solely by gravity. The size of the inlet opening and of the outlet opening can be selected depending on the liquid volume and also on design adaptations of the liquid collector to the aircraft cabin portion.

In a further implementation variant, the inlet opening can be larger than the outlet opening. This allows liquid to be collected from the top side of the cabin device module and/or along a greater region of the liquid-conducting element, and the liquid to be brought together to the smaller outlet opening. The liquid collector therefore also assumes the function of a funnel, the large inlet opening avoiding a situation where liquid runs past the liquid collector and possibly runs into a passenger region of the aircraft cabin portion.

Furthermore, a correspondingly long portion of the liquid-conducting element can be dispensed with as a result of a large inlet opening. For example, the liquid-conducting element can be produced from a foam or felt which conducts and/or absorbs liquid on the top side of the cabin device module. With a liquid collector made from flexible material and a large inlet opening, the liquid-conducting element can be replaced by the liquid collector made from flexible material, in particular, at the lower end of said liquid-conducting element. This saves not only weight on account of the lighter flexible material in comparison with the liquid-conducting element, but rather also avoids the weight of the liquid which is received in the liquid-conducting element (in particular in the case of felt).

In a further implementation variant, the liquid collector can comprise a hose which is connected to the outlet opening of the liquid collector. The hose can be connected in a fluid-tight manner to the outlet opening. For example, the lumen of the liquid collector can merge at its outlet opening into a lumen of the hose. The hose can easily be routed past components in the vicinity of the cabin device module.

An outlet opening of the hose can be arranged at a lower level than the outlet opening of the liquid collector. For example, the hose can be used to conduct liquid past aircraft components and to dispense it in a region which is already configured for receiving and/or for forwarding condensation. For instance, the outer side of the aircraft exterior skin insulation means (primary insulation means of the aircraft) is usually designed for draining condensation, with the result that the hose can be laid leading up to there. It goes without saying that the hose can also be routed as far as into a bilge of the aircraft.

In another implementation variant, the liquid collector can have a spreading element which forms the inlet opening at least in portions and holds the shell made from flexible material of the liquid collector spaced apart from one another. For example, the spreading element can run along a top side of the liquid collector and can form the top side of the inlet opening. The shell made from flexible material of the liquid collector likewise forms a top side of the liquid collector and a bottom side of the liquid collector, the lumen being enclosed by the flexible material between the top side and bottom side. In other words, flexible material portions are provided which form the top side and bottom side of the liquid collector. Here, that portion of the liquid collector which forms the top side adjoins the spreading element. For example, the shell made from flexible material is connected (in a fluid-tight manner) to the spreading element on the top side of the liquid collector, with the result that the spreading element holds the top side of the liquid collector spaced apart from the bottom side of the liquid collector.

Furthermore, in the further course of the lumen, the flexible material which forms the top side of the liquid collector can lie on the flexible material which forms the bottom side of the liquid collector. In other words, a shell made preferably from film which lies flatly folded over is formed which loses surface contact when flowed through by liquid. Since the lumen is open at the inlet opening and outlet opening of the liquid collector, liquid will flow through the lumen and in the process move the flexible material between the top side and bottom side apart from one another. Therefore, liquid can be conducted in a simple form and in a highly weight-saving manner. In particular, rigid and relatively heavy lines and pipes can be dispensed with.

Merely by way of example, the spreading element can be produced from a dimensionally stable foam. The shell made from flexible material which forms the top side of the liquid collector can be fastened, for example adhesively bonded, to the foam, or the foam is integrated into the flexible material.

As an alternative or in addition, the spreading element can be formed from a wire. A wire can likewise hold the flexible material forming the top side of the liquid collector spaced apart from the bottom side, and can additionally be bent in such a way that the inlet opening is adapted to (bears tightly against) surrounding components. In this way, the liquid collector can be adapted to the respective surroundings during the installation into the aircraft cabin portion, and can nevertheless be configured with an open (held open) inlet opening.

As an alternative, the spreading element can likewise preferably completely enclose or widen the inlet opening with a component which is produced from a plastic, preferably injection molded material. This injection molded part can be adhesively bonded onto aircraft components in one preferred embodiment. The spreading element can also have the form of a connection piece which is connected directly to the liquid-conducting element in special designs of aircraft components. As an alternative or in addition, the flexible material which forms the top side of the liquid collector can likewise be folded over on itself at its upper edge (along the inlet opening), and the upper edge can be fastened on the flexible material, with the result that a small quantity of air is enclosed in a hose-shaped bead along the upper edge. Since condensation usually accrues in the aircraft cabin portion at great altitudes, at which the pressure in the aircraft cabin is also decreased, the pressure of the air in the hose-shaped bead will increase relative to its surroundings. As a result, the volume of the small quantity of air in the bead increases, as a result of which the spreading element is formed, and the top side of the flexible material is held spaced apart from the bottom side.

In yet another implementation variant, furthermore, the aircraft cabin portion can comprise a holding element which holds the shell made from flexible material of the liquid collector at the lower end of the liquid-conducting element. The holding element can connect, in particular, a portion of the shell made from flexible material which forms the bottom side of the liquid collector to the lower end of the liquid-conducting element (in a fluid-tight manner). As a result, liquid is routed from/out of the liquid-conducting element through the inlet opening into the lumen of the liquid collector.

As an alternative or in addition, furthermore, the holding element can be fastened to the top side of the cabin device module in the region of the liquid-conducting element. As an alternative or in addition, the liquid-conducting element can likewise protrude at least in portions through the inlet opening into the lumen of the liquid collector, in order to dispense liquid in the lumen in a targeted manner.

Merely by way of example, the holding element can be an adhesive strip which is fastened to the liquid-conducting element and/or to the top side of the cabin device module. The shell made from flexible material which forms the bottom side of the liquid collector can be adhesively bonded to the adhesive strip along its edge which forms the inlet opening in portions. Conversely, the adhesive strip can also be fastened to the shell or integrated into it, and can be adhesively bonded to the liquid-conducting element and/or onto the top side of the cabin device module. In particular, a double-sided adhesive tape can also be used.

In another implementation variant, furthermore, the aircraft cabin portion can comprise a liquid-conducting component which is arranged next to and/or below the liquid-conducting element. The liquid-conducting component can be configured to conduct liquid through the aircraft cabin portion and/or downward away from the aircraft cabin portion.

Here, the liquid collector can be arranged in such a way that liquid flows out of the lumen of the liquid collector into or onto the liquid-conducting component. In other words, the lumen of the liquid collector connects the liquid-conducting element on the top side of the cabin device module to the liquid-conducting component.

In one implementation variant, the liquid-conducting component can be a side trim panel of the aircraft cabin portion, a rear wall of the cabin device module and/or an insulation means of the outer wall of the aircraft cabin portion. A side trim panel is, for example, a thin cover of a side region of the aircraft fuselage, the inner side of which is visible in the passenger cabin. A side trim panel can also comprise a light panel (also called a cove light panel) which is arranged, for example, between a luggage compartment and a side panel or window panel. A rear wall of the cabin device module is a side wall of the cabin device module which points outward. An insulation means of the outer wall of the aircraft cabin portion (more precisely, of the exterior skin of the aircraft) is usually designed to drain liquid such as, for example, condensation downward. By connection of the outlet opening of the lumen of the liquid collector to the insulation means, the liquid collected by the liquid collector can be dispensed downward onto the insulation means and can be drained further from the latter in a customary way. For example, the insulation means can have a water-conducting coating or the like on a top side and/or outer side, and can therefore form drainage paths.

In yet a further implementation variant, the cabin device module can be a luggage compartment, a side trim panel, a ceiling trim element and/or a monument. The luggage compartment can be an overhead luggage compartment which is installed, for example, above passenger seats. The ceiling trim element can be arranged, for example, above passenger seats and/or above a passenger aisle and can form the visible ceiling of the passenger cabin. A monument is usually a closed module such as, for example, a galley, and on-board toilet, a cabinet or the like. Each of these cabin device modules usually has a portion which is oriented at least partially upward, that is to say has a top side. In other words, liquid dripping from a ceiling region strikes the portion of the cabin device module and flows further out on its top side on account of gravity.

This liquid which flows on the top side of the cabin device module can be conducted by the liquid-conducting element (or a multiplicity thereof); in particular, the liquid can be conducted to the inlet opening of the liquid collector.

As an alternative or in addition to this, the liquid collector can also discharge liquid on its top side (outer side which lies at the top). As a result of the production of the liquid collector from flexible material, it discharges liquid not only in the lumen, but rather in the same way on the top side. In the case of a liquid collector which is wide relative to the cabin device module, in particular, the liquid collector covers the top side of the cabin device module and also protects it against liquid which drips downward in the region of the liquid collector and would drip onto the cabin device module or other aircraft components without the liquid collector.

In another implementation variant, the liquid collector can consist of a film which is folded over and welded along a longitudinal side of the liquid collector, or can consist of two films which are placed on one another and are welded along two opposite longitudinal sides of the liquid collector. As a result, a liquid collector of any desired size can be produced from one or two film pieces. The liquid collector can be produced simply, flexibly and inexpensively by way of the welding on one or two longitudinal sides. The shape of the lumen in the longitudinal and transverse direction can also be designed simply and inexpensively in a highly flexible manner.

As an alternative, the liquid collector can also be produced from a hose-shaped shell made from flexible material. For example, a film can be produced by way of extrusion with a closed cross section (enclosing the lumen).

In a further alternative, it goes without saying that one or more welded seams can also be introduced, in order to retrospectively define the shape of the lumen.

In accordance with a further aspect for improved understanding of the present disclosure, an aircraft comprises at least one aircraft cabin portion in accordance with the first aspect or one of the associated implementation variants.

Furthermore, it goes without saying that the above-described aspects and implementation variants can be combined without this being described explicitly. Each of the described implementation variants is therefore to be considered optional with respect to each of the aspects and their implementation variants or already combinations thereof. The present disclosure is therefore not restricted to the individual embodiments and implementation variants in the described sequence or a defined combination of the aspects and implementation variants.

BRIEF DESCRIPTION OF THE DRAWINGS

Preferred exemplary embodiments of the invention will now be explained in greater detail on the basis of the appended diagrammatic drawings, in which.

DETAILED DESCRIPTION OF THE PREFERRED EMBODIMENTS

Figure 1:
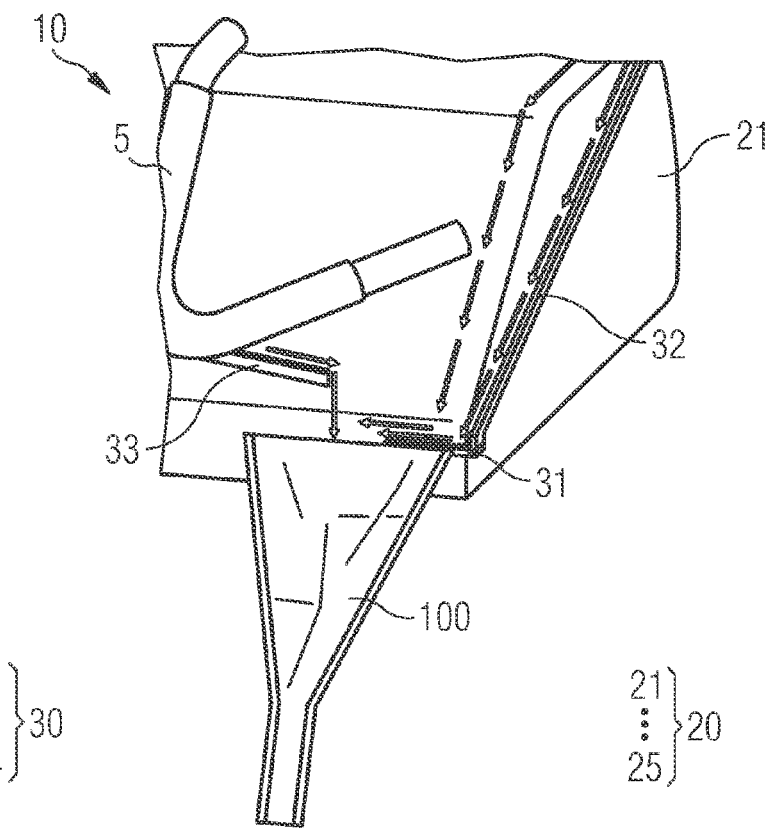
FIG. 1 diagrammatically shows a view of an aircraft cabin portion.

FIG. 1 diagrammatically shows a view of an aircraft cabin portion 10 which comprises a cabin device module 20 in the form of an overhead luggage compartment 21. The overhead luggage compartment 21 is shown here on the rear side, with the result that its top side is visible. At least one liquid-conducting element 30 is attached on and to the cabin device module 20. This liquid-conducting element 30 can be implemented, for example, in the form of a strip made from foam or felt, or in the form of a depression or channel which is integrated into or attached to the cabin device module 20.

FIG. 1 shows a liquid-conducting element 32 which is installed on a side wall of the overhead luggage compartment 21, it being possible, for example, for the side wall to adjoin a side wall of a further overhead luggage compartment (not shown). A further liquid-conducting element 33 is provided on the top side of the overhead luggage compartment 21, while a third liquid-conducting element 31 is installed on a rear side of the overhead luggage compartment 21. A liquid, for example condensation, which accrues on the overhead luggage compartment 21 is impeded from flowing onto a side below the overhead luggage compartment 21 by way of the liquid-conducting elements 30. In this way, the aircraft cabin, in particular a passenger region, is protected against condensation which drips or flows downward.

Furthermore, the aircraft cabin portion 10 comprises a liquid collector 100 which is arranged at a lower end of one of the liquid-conducting elements, here the liquid-conducting elements 31 and 33. The liquid collector 100, which will be described in even greater detail in relation to FIG. 7, is produced from a flexible material and has a lumen. The lumen can be a cavity which is delimited by a shell. Liquid from the liquid-conducting elements 30 can be collected and discharged downward by way of the lumen.

As can be seen from FIG. 1, aircraft components 5 are installed in a region above the top side of the cabin device module 20. For example, a ventilation pipe may be the aircraft component 5 installed there. Aircraft components 5 of this type are usually also situated in a rear-side region of the cabin device module 20, with the result that all the liquid-conducting structural elements have to be laid around these aircraft components 5. The liquid collector 100 made from flexible material can be installed and laid in a highly simple and inexpensive way, without having to be adapted specifically to the position of the aircraft components 5. The flexible material can consist of film material.

Figure 2:
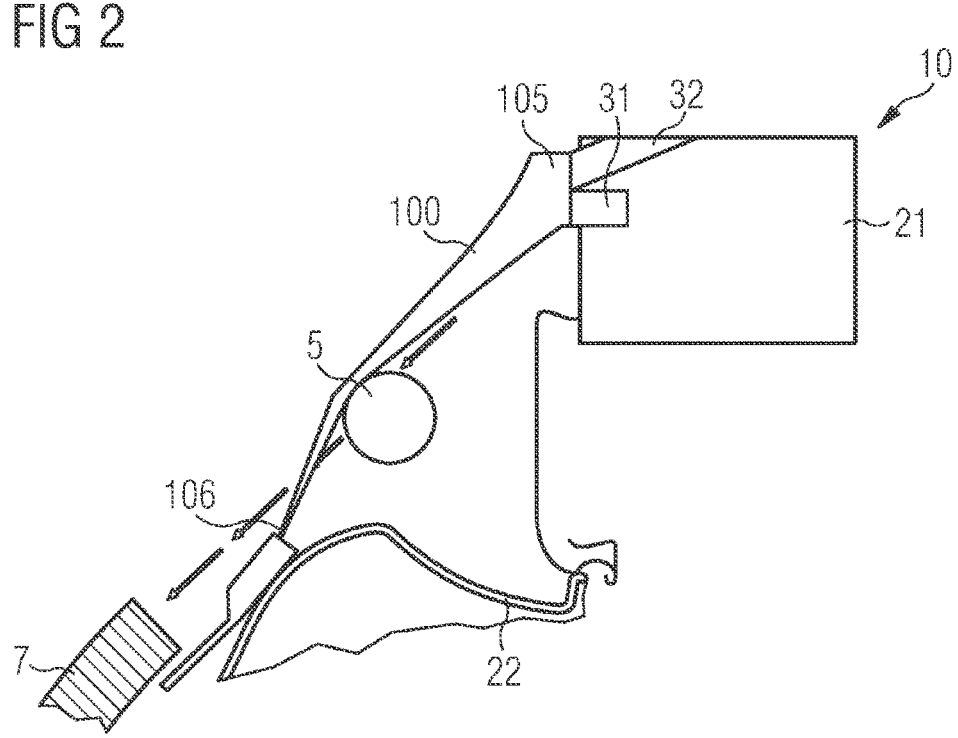
FIG. 2 diagrammatically shows a side view of an aircraft cabin portion.

FIG. 2 shows a sectional view of an aircraft cabin portion 10, for example the aircraft cabin portion 10 from FIG. 1. The position and the course of the liquid collector 100 can be seen clearly therein. In an upper region, in which an inlet opening 105 of the lumen of the liquid collector 100 is situated, the liquid collector 100 is arranged at the lower end of the liquid-conducting element 31, with the result that liquid flows from the liquid-conducting element 31 through the inlet opening 105 into the lumen.

The liquid collector 100 is laid in such a way that a lower end thereof, in particular a lower outlet opening 106 of the liquid collector 100, is arranged in the region of a side trim panel 22 (shown here as a cove light panel). The liquid which flows through the lumen of the liquid collector 100 is therefore conducted through the outlet opening 106 onto the liquid-conducting component (here, the side trim panel 22). As an alternative or in addition, the liquid which leaves the lumen of the liquid collector 100 at the outlet opening 106 can be conducted onto an insulation means 7, like an insulation panel, of the outer wall of the aircraft cabin portion 10. The liquid flow is shown diagrammatically by way of arrows in FIG. 2 beside the liquid collector 100 and the actual liquid-conducting lumen thereof.

As is likewise shown in FIG. 2, the liquid collector 100 made from flexible material can be laid in a simple way, even if aircraft components 5 are situated in an intermediate space between the cabin device module 20 and the exterior skin of the aircraft 1. Instead of a rigid component of complex shape, the liquid collector 100 made from flexible material can be laid simply over the aircraft components 5.

In order to prevent the liquid collector 100 changing its position during operation of the aircraft in such a way that the liquid is no longer collected and/or can no longer be forwarded to the next (in the flow direction) liquid-conducting component 7, 22, the liquid collector 100 can be fastened in the region of its inlet opening 105 and outlet opening 106 to the corresponding modules and components. For example, a bottom side of the liquid collector 100 can be fastened in the region of the inlet opening 105 to the cabin device module 20 and/or to the liquid-conducting element 30. A bottom side of the liquid collector 100 can likewise be fastened in the region of the outlet opening 106 to the liquid-conducting component, for example in the form of the side trim panel 22 and/or the insulation means 7 or any desired liquid-conducting component which is arranged in between.

Figure 3:
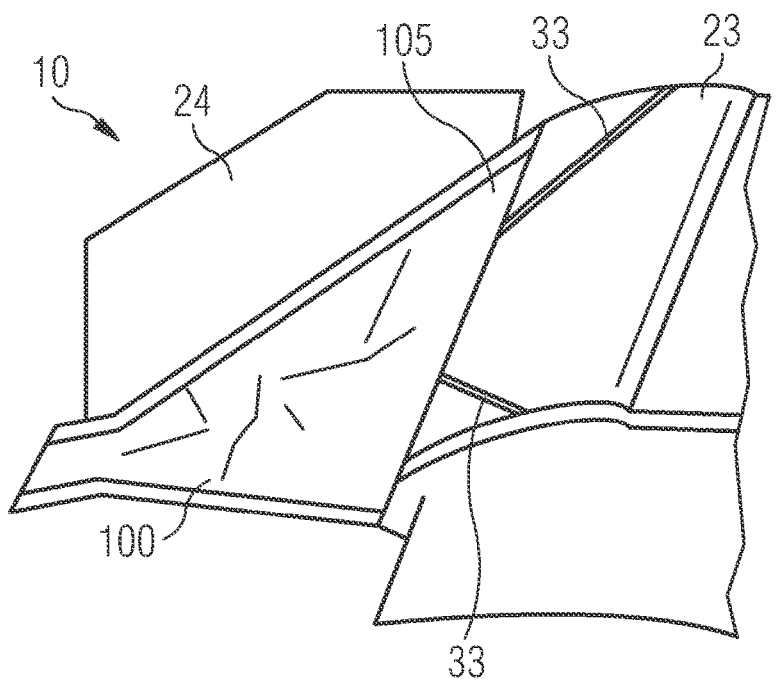
FIG. 3 diagrammatically shows a first view of an aircraft cabin portion.
Figure 4:
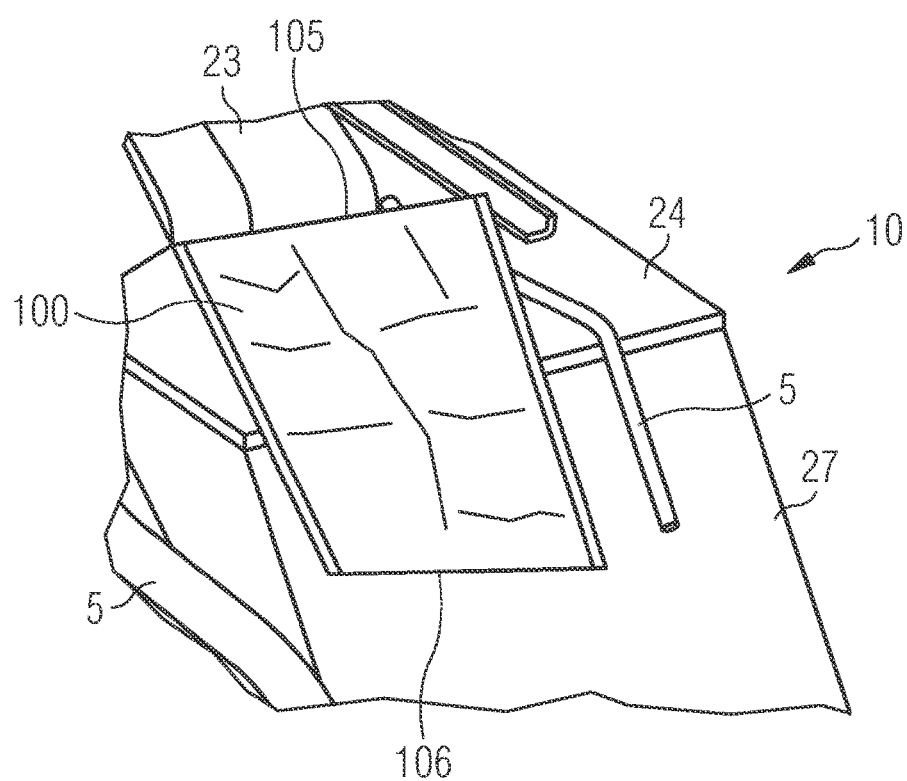
FIG. 4 diagrammatically shows a second view of an aircraft cabin portion.
Figure 5:
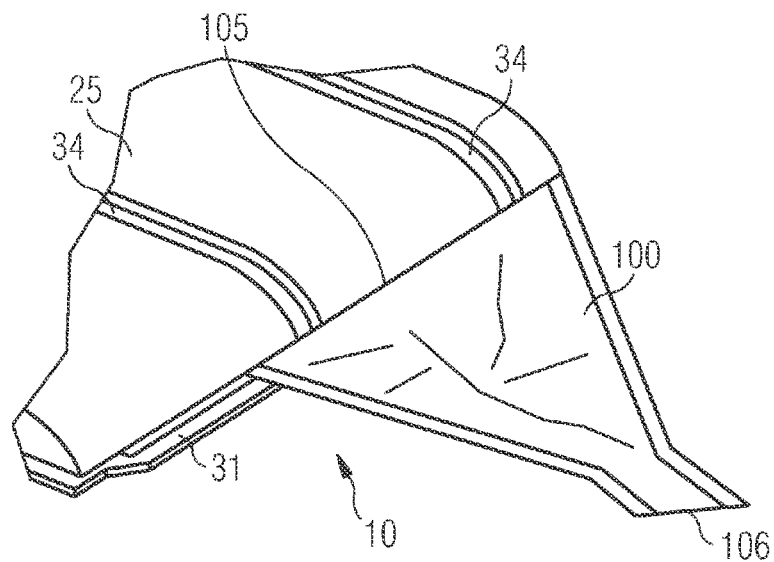
FIG. 5 diagrammatically shows a third view of an aircraft cabin portion.

FIGS. 3 to 5 each show a diagrammatic view of an aircraft cabin portion 10. In the aircraft cabin portion 10 according to FIG. 3, a ceiling trim element 23 is arranged next to and above a monument 24. Liquid-conducting elements 33 which conduct a liquid on the top side of the ceiling trim element 23 in the direction of the monument 24 can likewise be arranged on the ceiling trim element 23. A liquid collector 100 made from flexible material which receives the liquid from the top side of the ceiling trim element 23 is arranged adjacently thereto.

As can be seen from FIG. 3, the inlet opening 105 of the liquid collector 100 can be designed in such a way that it extends over the entire width of the ceiling trim element 23. Therefore, the liquid-conducting elements 33 can also be dispensed with, since all the liquid which passes onto the ceiling trim element 23 is received into the lumen of the liquid collector 100 via its inlet opening 105.

A corresponding configuration comprising the ceiling trim element 23 and monument 24 is also shown in FIG. 4. Here, however, the liquid collector 100 made from flexible material is also of relatively wide design at its outlet opening 106. For example, the outlet opening 106 can be exactly as wide as the inlet opening 105. As an alternative, the outlet opening 106 can be almost as wide as the inlet opening 105 and, in particular, can be adapted to the width of a liquid-conducting portion of a rear wall 27 of the monument 24.

Furthermore, the liquid collector 100 can be configured to be so long between the inlet opening 105 and the outlet opening 106 that the liquid collector 100 covers the top side of the monument 24. In other words, the outlet opening 106 of the liquid collector 100 lies in a region of the rear wall 27 of the monument 24.

Therefore, no further liquid-conducting elements have to be provided on the top side of the monument 24 and possibly also in a region of the rear wall 27 of the monument 24. Liquid which passes onto a top side (upper outer side) of the liquid collector 100 can also be discharged on the top side of the liquid collector 100 and can be conducted to the rear wall 27 of the monument 24. Therefore, on its outer top side and in its lumen, the entire liquid collector 100 forms a liquid-conducting component which protects the monument 24. Possibly present aircraft components 5 can likewise be covered and protected by the liquid collector 100 here.

Finally, FIG. 5 shows a further cabin device module 20 in the form of a ceiling element 23. Liquid-conducting elements 34 in the form of channels or depressions are provided in the ceiling element 23. These can be integrated into the ceiling element 23, for example, with the result that no additional elements are necessary. A liquid-conducting element 31 in the form of a channel or made from felt can be installed on a side edge of the ceiling element 23. Here, the inlet opening 105 of the liquid collector 100 can be dimensioned in such a way that it spans at least one channel or depression 34 (two channels 34 are preferably shown) of the ceiling element 23 and guides liquid out of the channel or depression 34 into the lumen of the liquid collector 100.

Figure 6:
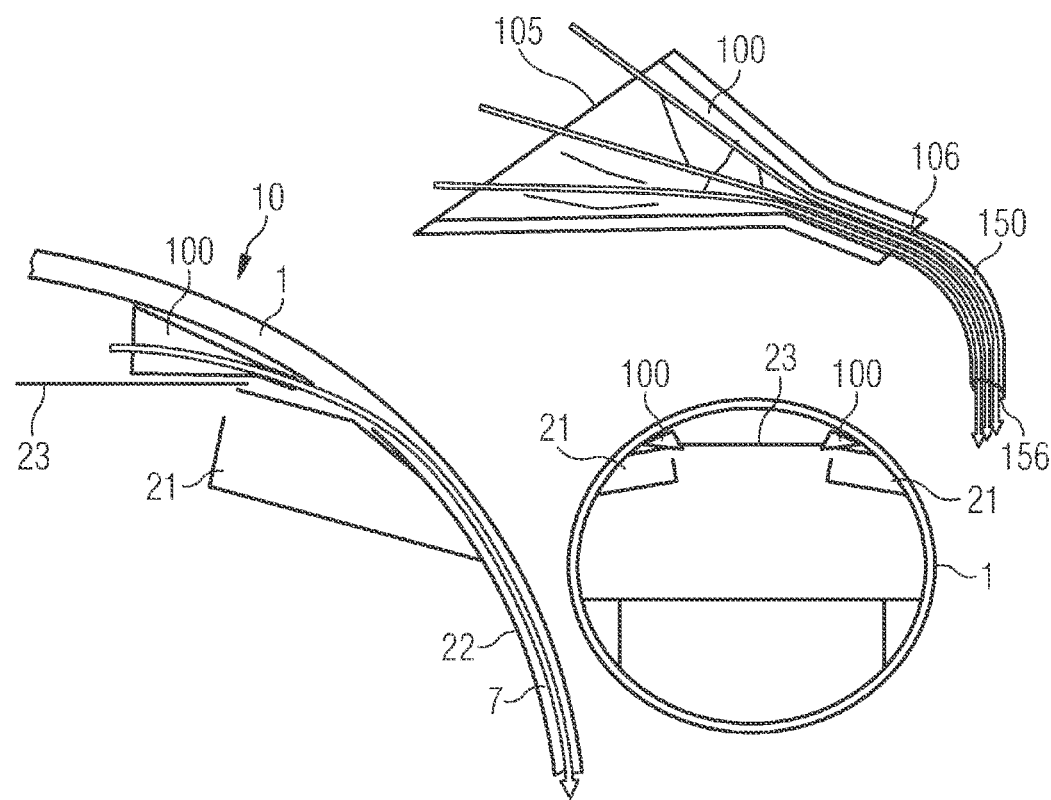
FIG. 6 diagrammatically shows side views of an aircraft and aircraft cabin portion, and a liquid collector with associated liquid flows, FIG. 7 diagrammatically shows a liquid collector in detail, FIG. 8(a) diagrammatically shows a first embodiment of a liquid collector, FIG. 8(b) diagrammatically shows a second embodiment of a liquid collector, FIG. 8(c) diagrammatically shows a third embodiment of a liquid collector, FIG. 8(d) diagrammatically shows a fourth embodiment of a liquid collector, FIG. 8(e) diagrammatically shows a fifth embodiment of a liquid collector, FIG. 9(a) diagrammatically shows another embodiment of a liquid collector, FIG. 9(b) diagrammatically shows a further embodiment of a liquid collector, FIG. 9(c) diagrammatically shows still another embodiment of a liquid collector, FIG. 10(a) diagrammatically shows an embodiment of a liquid collector with a hose, FIG. 10(b) diagrammatically shows another embodiment of a liquid collector with a hose FIG. 11(a) diagrammatically shows a further embodiment of a liquid collector with a hose, and, FIG. 11(b) diagrammatically shows another further embodiment of a liquid collector with a hose.

FIG. 6 diagrammatically shows a sectional view of an aircraft 1 and an aircraft cabin portion 10 and a liquid collector 100. Thus, for example, a ceiling element 23 and two luggage compartments 21 which lie opposite one another are arranged in the aircraft 1. A liquid collector 100 which conducts liquid from the ceiling element 23 to the respective luggage compartment 21 is provided at each transition point between the ceiling element 23 and the respective luggage compartment 21.

A liquid collector 100 can likewise be provided (not shown) at a transition point between the luggage compartment 21 and the side trim panel 22 or the insulation means 7. As an alternative, liquid can be conducted from the luggage compartment 21 directly onto an outer side of the side trim panel 22 and/or onto the insulation means 7, for example by way of corresponding configuration of the top side of the luggage compartment 21.

Since most condensation accrues in the region of the ceiling element 23, the liquid collector 100 which is installed there can merge at its outlet opening 106 into a hose 150. For example, the hose 150 can be connected (in a fluid-tight manner) to the outlet opening 106. The hose 150 can be guided past the luggage compartment 21. An outlet opening 156 of the hose 150 can lie on an outer side of the side trim panel 22 and/or on the insulation means 7, with the result that the liquid can be conducted from the ceiling element 23 directly to there. The hose 150 can be produced from a different material and with a different thickness than the liquid collector 100 made from flexible material.

FIG. 7 shows the liquid collector 100 made from flexible material in greater detail. In particular, the inlet opening 105 can be seen. For example, a lower film or a lower shell part of the liquid collector 100 can be equipped with a holding element 110 along its edge at the inlet opening 105. The holding element 110 can be, for example, an adhesive strip, by way of which the lower film or the lower shell part of the liquid collector 100 can be fastened to the lower end of the liquid-conducting element 30 and/or to a top side of the cabin device module 20.

In order to hold the inlet opening 105 in an open state and therefore to make it possible that liquid can enter into the lumen of the liquid collector 100 at all times, a spreading element 120 is provided. The spreading element 120 spreads the inlet opening 105, with the result that an upper film or an upper shell part of the liquid collector 100, in the region of the inlet opening 105, does not lie directly on the lower film/the lower shell part of the liquid collector 100 and would close the inlet opening 105. The spreading element 120 can be produced, for example, from a dimensionally stable foam which is connected to the upper film/the upper shell part of the liquid collector 100 or is integrated into it. As an alternative or in addition, a wire can also form the spreading element 120. The spreading element can also be a plastics part, preferably an injection molded part. It can also be of peripheral configuration and can therefore also fulfill the function of the holding element 110, by the plastics part being adhesively bonded to the lower side. In every case, the upper film of the liquid collector 100 is held spaced apart from the lower film of the liquid collector 100 in the region of the inlet opening 105.

The liquid collector 100 which is shown in FIG. 7 is welded in the longitudinal direction (along the lumen) to the two longitudinal sides 103 which lie opposite one another. In other words, the liquid collector 100 is produced from two films or shell parts which lie on one another and are welded on the two longitudinal sides 103 which lie opposite one another. It goes without saying that the liquid collector 100 can be produced from one piece which is folded and superimposed and is welded on its open sides along the longitudinal side 103. It is likewise conceivable that the liquid collector 100 is produced from a tubular film or shell without welded seams in the longitudinal direction.

FIGS. 8(a) to 8(e) show different embodiments of a liquid collector 100. For instance, FIG. 8(a) shows a liquid collector 100 which has an inlet opening 105 with a width B1 and an outlet opening 106 with a width B5. Here, the width B1 is greater than the width B5, with the result that the liquid collector 100 can assume a funnel function. FIG. 8(b) shows a liquid collector 100 of similar design which, however, has a width B2 at the inlet opening 105. The width B2 is smaller than the width B1 from FIG. 8(a). This is intended to illustrate that the liquid collector 100 can be adapted in a simple way to the conditions in the aircraft cabin portion 10. For example, the shape of the liquid collector 100 and, in particular, its lumen can be adapted in a highly simple, flexible and inexpensive manner by way of positioning of the welded seams which form the longitudinal sides 103 of the liquid collector 100.

FIG. 8(c) shows a liquid collector 100, the inlet opening 105 and outlet opening 106 of which are of approximately identical dimensions. Here, the welded seams can run correspondingly along the longitudinal sides 103. As an alternative, the liquid collector 100 can also be produced from two identical liquid collectors 100a and 100b which are connected to one another (for example, are welded to one another) at their narrow ends, their lumens being connected to one another (merging into one another).

FIGS. 8(d) and 8(e) show liquid collectors 100, the lumen of which has a non-rectilinear course. In part FIG. 8(d), for example, a narrowing lumen merges into a hose-shaped lumen. In other words, the liquid collector 100 comprises a portion which acts as a hose. In accordance with the variant from FIG. 8(e), two identical liquid collectors 100a and 100b are again connected to one another.

The non-rectilinear course of the lumen can be used in both cases, in order to lay the liquid collector 100 around aircraft components 5. It is of course likewise possible for a liquid collector 100 with a rectilinear course of the lumen to be laid in such a way that the liquid collector 100 runs around aircraft components 5. For example, the liquid collector 100 can be produced with a lumen which is so long that it can assume a non-rectilinear course around all aircraft components 5.

It goes without saying that no liquid is collected by way of the downstream liquid collector 100 (100b), but rather is discharged in the embodiments disclosed here of the liquid collector 100 which is produced from two liquid collectors 100 or comprises two liquid collectors 100.

FIGS. 8(d) and 8(e) likewise show that the liquid collector 100 can be produced from flexible material portions which form a lumen along welded seams 103, while the remaining portions (lying outside the welded seams 103) of the flexible materials, for example a film, are not cut off. As a result, the liquid collector 100 can cover a greater portion of a cabin device module 20, as a result of which the latter is protected, for example against dripping liquids. This additional protection is achieved by a minimum of additional weight.

Figure 9A:
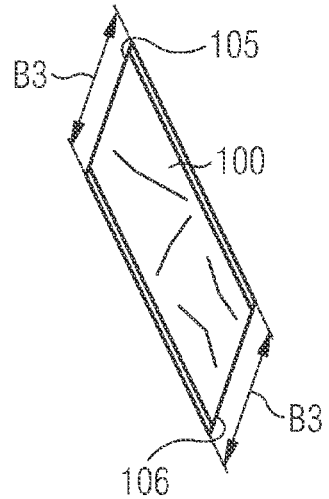
Figure 9B:
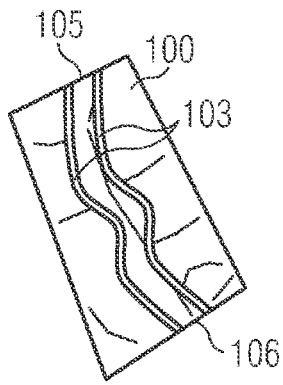
Figure 9C:
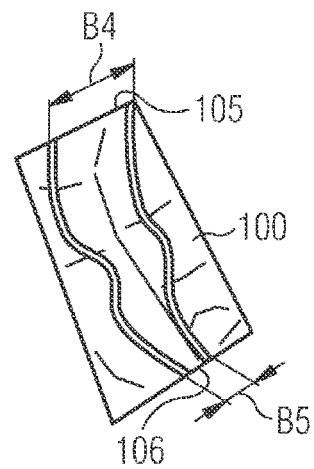

FIGS. 9(a) to 9(c) show further liquid collectors 100. For instance, it can be seen from FIG. 9(a) that trapezoidal or diamond-shaped liquid collectors 100 or lumens can also be produced. For example, these liquid collectors 100 can have an inlet opening 105 and an outlet opening 106 each with the same width B3. In addition to a continuously non-rectilinear course of the welded seams 103 with an inlet opening 105 and outlet opening 106 of (virtually) identical width (see FIG. 9(b)), the non-rectilinear welded seams 103 can run from an inlet opening 105 with the width B4 to an outlet opening 106 with the width B5, B4 being greater than B5 (see FIG. 9(c)).

In comparison with FIG. 8(d) which shows welded seams 103 which are arranged so as to converge first of all in a rectilinear manner from the inlet opening and merge into non-rectilinear welded seams 103, the welded seams 103 can also run in a continuously non-rectilinear manner and can nevertheless taper the lumen which is enclosed in the process, as shown in FIG. 9(c). In both cases, a funnel function can be integrated into the liquid collector 100, it being possible for the contour of the lumen to be adapted to the conditions in the aircraft cabin portion 10, in particular to aircraft components 5 which are arranged there. In this way, the functions of a funnel-shaped and a hose-shaped portion can be combined.

Figure 10A:
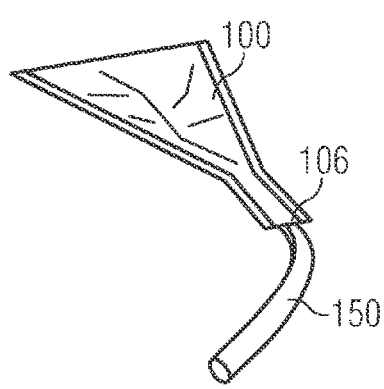
Figure 10B:
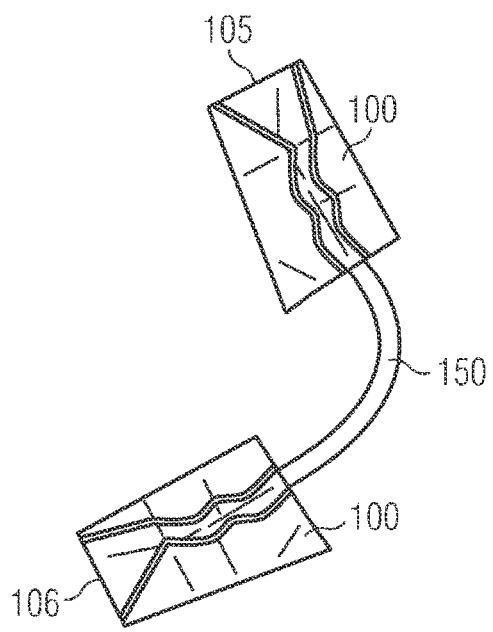

Furthermore, FIGS. 10(a) and 10(b) show embodiments of a liquid collector 100 with a hose 150 connected to it. For example, the hose 150 can be attached to an outlet 106 of the lumen of the liquid collector 100 made from flexible material, the lumen of the hose 150 being connected to the lumen of the liquid collector 100 and being closed off toward the outside in a fluid-tight manner.

In comparison with the embodiments of a liquid collector 100 according to FIGS. 8(c) and 8(e), a hose 150 can be arranged between two liquid collectors 100 (see FIG. 10(b)). As a result, liquid can be captured by way of a first liquid collector 100, and can be discharged again by way of a second liquid collector 100 over a greater (wider) region than the hose 150. This makes, for example, the conducting of liquid through a region of the aircraft cabin portion which is very narrow possible with the aid of the hose, while the liquid can be collected and discharged over a wider region in the region of the inlet opening 105 of the first liquid collector 100 and in the region of the outlet opening 106 of the second liquid collector 100. The two liquid collectors 100 can be arranged, for example, in regions of the aircraft cabin portion 10 in which a course which is as flexible as possible is necessary.

Figure 11A:
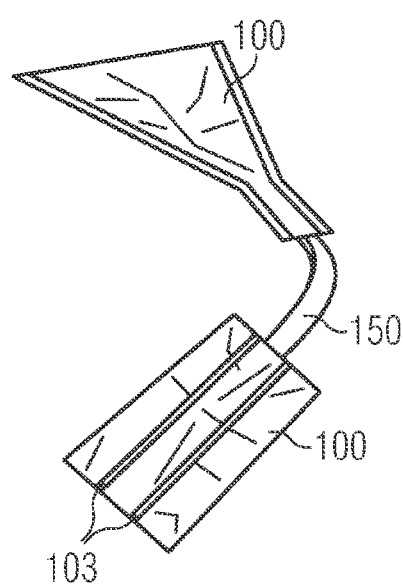
Figure 11B:
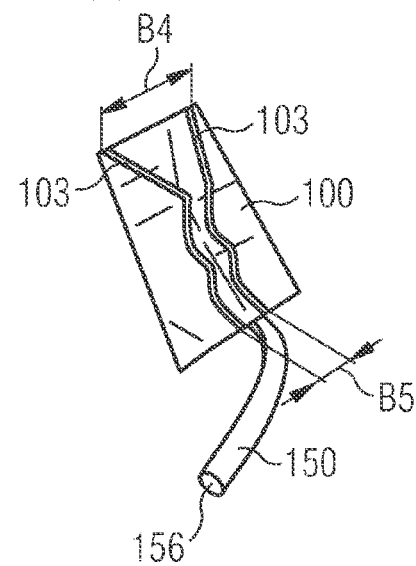

Finally, FIGS. 11(a) and 11(b) show further variants of a liquid collector 100 with a hose 150. For instance, FIG. 11(a) shows an arrangement as in FIG. 10(a), to which arrangement a further liquid collector 100 is connected downstream at the end of the hose 150. This lower (as viewed downstream) liquid collector 100 is equipped with rectilinear and substantially parallel welded seams 103, with the result that a lumen is formed which, for example, corresponds to the lumen of the hose 150. The liquid collector 100 can be laid more flexibly downstream of the hose 150, however.

FIG. 11(b) shows a combination of the liquid collector 100 from FIG. 9(c) with a hose 150. All of the proposed embodiments of a liquid collector 100 with a hose 150 can be used, for example, in such a way that the hose 150 is guided past aircraft components 5 or a cabin device module 20, and the hose 150 ends in a region of the aircraft cabin portion 10 (its outlet opening 156 is arranged in one region), in which liquid can usually be received and/or discharged. The hose 150 can have a higher strength than the shell made from flexible material of the liquid collector 100, in particular against crushing (closing of the lumen).

It goes without saying that, in the embodiments disclosed here of the liquid collector 100 which is produced from two liquid collectors 100 or comprises two liquid collectors 100, no liquid is collected by the downstream liquid collector 100

(100b), but rather is discharged. Since, however, the construction and the production of the downstream lumen corresponds to that of the upstream liquid collector 100, one liquid collector 100 is discussed here in a simplified manner. This downstream portion might likewise serve as a liquid collector if the entire component were rotated. A specific installation direction and therefore flow direction of the lumen are therefore not necessarily specified.

The above-described exemplary embodiments and variants serve merely to illustrate the invention. All examples, variants and individual details can be combined with one another in any desired way, in order to form defined embodiments of the invention.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft cabin portion comprising:
a cabin device module which has a top side;
a liquid-conducting element arranged on the top side of the cabin device module; and
a liquid collector arranged at a lower end of the liquid-conducting element,
wherein the liquid collector comprises a flexible material which forms a lumen for discharging a liquid, the lumen having an inlet opening arranged at the lower end of the liquid-conducting element, such that liquid flows from the liquid-conducting element into the lumen,
wherein the flexible material forms a shell surrounding the lumen, the shell having a top shell side and a bottom shell side at least partially in surface contact with the top shell side,
wherein at least a portion of the bottom shell side in surface contact with the top shell side becomes separated from the top shell side when the liquid flows through the flexible material.

2. The aircraft cabin portion as claimed in claim 1, wherein the liquid collector further comprises an outlet opening arranged such that the liquid flows out of the lumen of the liquid collector.

3. The aircraft cabin portion as claimed in claim 2, further comprising:
a hose connected to the outlet opening of the liquid collector.

4. The aircraft cabin portion as claimed in claim 1, wherein the liquid collector further comprises a spreading element which forms the inlet opening, at least in portions, and holds portions of the top shell side and the bottom shell side spaced apart from one another.

5. The aircraft cabin portion as claimed in claim 1, further comprising:
a holding element configured to hold the liquid collector at the lower end of the liquid-conducting element.

6. The aircraft cabin portion as claimed in claim 5, wherein the holding element comprises an adhesive strip fastened to the liquid-conducting element, or to the top side of the cabin device module, or to both.

7. The aircraft cabin portion as claimed in claim 1, further comprising:
a liquid-conducting component arranged next to, or below, or next to and below the liquid-conducting element, wherein the liquid collector is configured such that the liquid flows out of the lumen of the liquid collector and into or onto the liquid-conducting component.

8. The aircraft cabin portion as claimed in claim 7, wherein the liquid-conducting component comprises at least one of a side trim panel of the aircraft cabin portion, a rear wall of the cabin device module, and an insulation means of an outer wall of the aircraft cabin portion.

9. The aircraft cabin portion as claimed in claim 1, wherein the cabin device module comprises at least one of a luggage compartment, a side trim panel, a ceiling trim element, and a monument.

10. The aircraft cabin portion as claimed in claim 1, wherein the flexible material is folded over and welded along a longitudinal side of the liquid collector.

11. The aircraft cabin portion as claimed in 1, wherein the flexible material comprises two flexible material portions which are placed on one another and are welded along two opposite longitudinal sides of the liquid collector.

12. An aircraft comprising:
the aircraft cabin portion as claimed in claim 1.

13. An aircraft cabin portion comprising:
a cabin device module which has a top side;
a liquid-conducting element arranged on the top side of the cabin device module; and
a liquid collector arranged at a lower end of the liquid-conducting element,
wherein the liquid collector comprises a flexible material which forms a lumen for discharging a liquid, the lumen having an inlet opening arranged at the lower end of the liquid-conducting element, such that liquid flows from the liquid-conducting element into the lumen, and
wherein the flexible material forms a shell enclosing the lumen, the shell having a top shell side and a bottom shell side, the top shell side and the bottom shell side oblongly defining the inlet opening such that the inlet opening extends linearly at the lower end of the liquid-conducting element.

14. The aircraft cabin portion as claimed in claim 13, wherein the liquid collector further comprises a spreading element which forms the inlet opening, at least in portions, and holds portions of the top shell side and the bottom shell side spaced apart from one another.

15. The aircraft cabin portion as claimed in claim 13, further comprising:
a holding element configured to hold the liquid collector at the lower end of the liquid-conducting element.

16. The aircraft cabin portion as claimed in claim 15, wherein the holding element comprises an adhesive strip fastened to the liquid-conducting element, or to the top side of the cabin device module, or to both.

17. The aircraft cabin portion as claimed in claim 13, further comprising:
a liquid-conducting component arranged next to, or below, or next to and below the liquid-conducting element, wherein the liquid collector is configured such that the liquid flows out of the lumen of the liquid collector and into or onto the liquid-conducting component.

18. The aircraft cabin portion as claimed in claim 17, wherein the liquid-conducting component comprises at least one of a side trim panel of the aircraft cabin portion, a rear wall of the cabin device module, and an insulation means of an outer wall of the aircraft cabin portion.

19. The aircraft cabin portion as claimed in claim 13, wherein the cabin device module comprises at least one of a luggage compartment, a side trim panel, a ceiling trim element, and a monument.

* * * * *